United States Patent [19]

Ferguson et al.

[11] Patent Number: 4,974,104
[45] Date of Patent: Nov. 27, 1990

[54] LINEAR ACTUATOR DISK FILE WITH SYMMETRIC HOUSING

[75] Inventors: Noel S. Ferguson; Jeffery L. Wang, both of San Jose, Calif.

[73] Assignee: International Business Machines Corporation, Armonk, N.Y.

[21] Appl. No.: 249,924

[22] Filed: Sep. 27, 1988

[51] Int. Cl.$^5$ ............................................. G11B 33/14
[52] U.S. Cl. ............................... 360/97.03; 360/97.04
[58] Field of Search ............... 360/97.01, 97.02–97.04, 360/98.07, 99.08

[56] References Cited

U.S. PATENT DOCUMENTS

| | | | |
|---|---|---|---|
| 4,005,490 | 1/1977 | Duncan et al. | 360/97 |
| 4,519,010 | 5/1985 | Elsaessar et al. | 360/97 |
| 4,587,645 | 5/1986 | Wong et al. | 360/97.03 X |
| 4,607,182 | 8/1986 | Ballhaus | 310/90 |
| 4,677,509 | 6/1987 | Nishida et al. | 360/98.07 |
| 4,692,827 | 9/1987 | Biermeier et al. | 360/97.03 |
| 4,743,995 | 5/1988 | Castle et al. | 360/98 |

OTHER PUBLICATIONS

M. Pearce, "Who Needs High Capacities?", Computer Systems (Nov. 1983), pp. 81–84.

Primary Examiner—John H. Wolff
Attorney, Agent, or Firm—Thomas R. Berthold; George M. Knight

[57] ABSTRACT

A data recording disk file includes a disk stack subassembly and a linear actuator, both of which are supported by a single-piece casting which forms part of the disk file housing. The casting is symmetric about two perpendicular planes and includes an open-ended portion and an actuator portion. The disk stack subassembly, which includes an in-hub motor, is entirely supported in the open-ended portion by two parallel interior walls which are equally spaced from the first plane of the casting. The linear actuator is entirely supported in the actuator portion by two parallel side walls which are equally spaced from the second plane of the casting. The actuator is mounted to the side walls in its plane of symmetry, which coincides with the first plane of the casting, and with its linear access axis coincident with the intersection of the two planes. The disk file housing is made complete by an end cap which attaches to the open-ended portion of the casting to enclose the disk stack subassembly, and by cover plates and a casting end wall which enclose the actuator.

10 Claims, 3 Drawing Sheets

LINEAR ACTUATOR DISK FILE WITH SYMMETRIC HOUSING

TECHNICAL FIELD

The present invention relates to data recording disk files of the type which utilize an "in-hub" disk drive motor and a linear actuator, and more particularly to the housing for supporting and enclosing the disks, the drive motor and the actuator.

BACKGROUND OF THE INVENTION

Conventional data recording disk files utilize one or more rotatable disks with concentric data tracks, one or more heads for reading or writing data onto the various tracks, and an actuator connected by a support arm assembly to the heads for moving the heads to the desired tracks and maintaining them over the track centerlines during read or write operations. The disks are mounted in a stack on a hub which is attached to a rotatable shaft. The disk drive motor for rotating the disks may be a DC brushless motor which is located in the region between the hub and the shaft. The use of this type of "in-hub" motor results in a complete disk stack subassembly, which includes the drive motor, shaft, hub, bearing assemblies and disk stack, and which thereby eliminates the need for a drive motor located externally of the disk file housing.

Disk files which use in-hub disk drive motors are described in U.S. Pat. Nos. 4,005,490; 4,519,010 and 4,607,182. While the disk files described in these patents use either fixed heads or a rotary (i.e., "swinging arm") actuator, it is also possible to use a linear actuator in disk files which have in-hub motors. One common form of construction of the housing for such disk files is for both the actuator and the disk stack subassembly to be mounted on a rigid base plate or dish. A cover plate is then placed over the base plate or dish to enclose the actuator and to support the other end of the disk stack subassembly. Typically, a surface of the middle disk in the stack contains head positioning servo information, and the corresponding head is a dedicated servo head which reads the servo information to position the data heads on the data tracks. One problem with this type of construction is that bending of the base plate, caused by unsymmetrical thermal expansion of the base plate and cover plate and vibration of the disk stack relative to the actuator caused by movement of the actuator, can result in head-to-track misregistration or head-to-head misregistration.

Assignee's U.S. Pat. No. 4,743,995 describes a disk file with an in-hub motor and two linear actuators. The disk stack subassembly in the '995 patent includes a stationary shaft which is mounted to cut-outs on spaced-apart arms of a central box frame. Separate housings for the linear actuators are bolted to the box frame at equal angles to the plane of symmetry of the box frame.

SUMMARY OF THE INVENTION

The invention is a data recording disk file which includes a linear actuator and a disk stack subassembly with an in-hub motor, both the linear actuator and disk stack subassembly being supported by a single-piece casting which forms part of the disk file housing. The casting is symmetric about two perpendicular planes and includes an open-ended portion and an actuator portion. The disk stack subassembly is entirely supported in the open-ended portion by two parallel interior walls which are equally spaced from the first plane of the casting. The linear actuator is entirely supported in the actuator portion by two parallel side walls which are equally spaced from the second plane of the casting. The actuator is mounted to the side walls in its plane of symmetry, which coincides with the first plane of the casting, and with its linear access axis coincident with the intersection of the two planes. The disk file housing is made complete by an end cap which attaches to the open-ended portion of the casting to enclose the disk stack subassembly, and by cover plates and a casting end wall which enclose the linear actuator.

Because the completed disk file housing, the linear actuator and the disk stack subassembly are all substantially symmetric about two perpendicular planes which intersect along a line coinciding with the actuator's linear access direction, changes in temperature cause portions of the disk file to expand or contract symmetrically, thereby essentially eliminating any thermally induced head-to-track misregistration or head-to-head misregistration. In addition, because a single-piece casting entirely supports both the disk stack subassembly and the linear actuator, any vibrational resonances introduced between these components during operation of the disk file are substantially minimized, thereby improving the ability of the actuator to cause the heads to follow the data tracks on the disks.

For a fuller understanding of the nature and advantages of the present invention, reference should be made to the following detailed description taken in conjunction with the accompanying drawings.

DESCRIPTION OF THE PREFERRED EMBODIMENT

Figure 1:
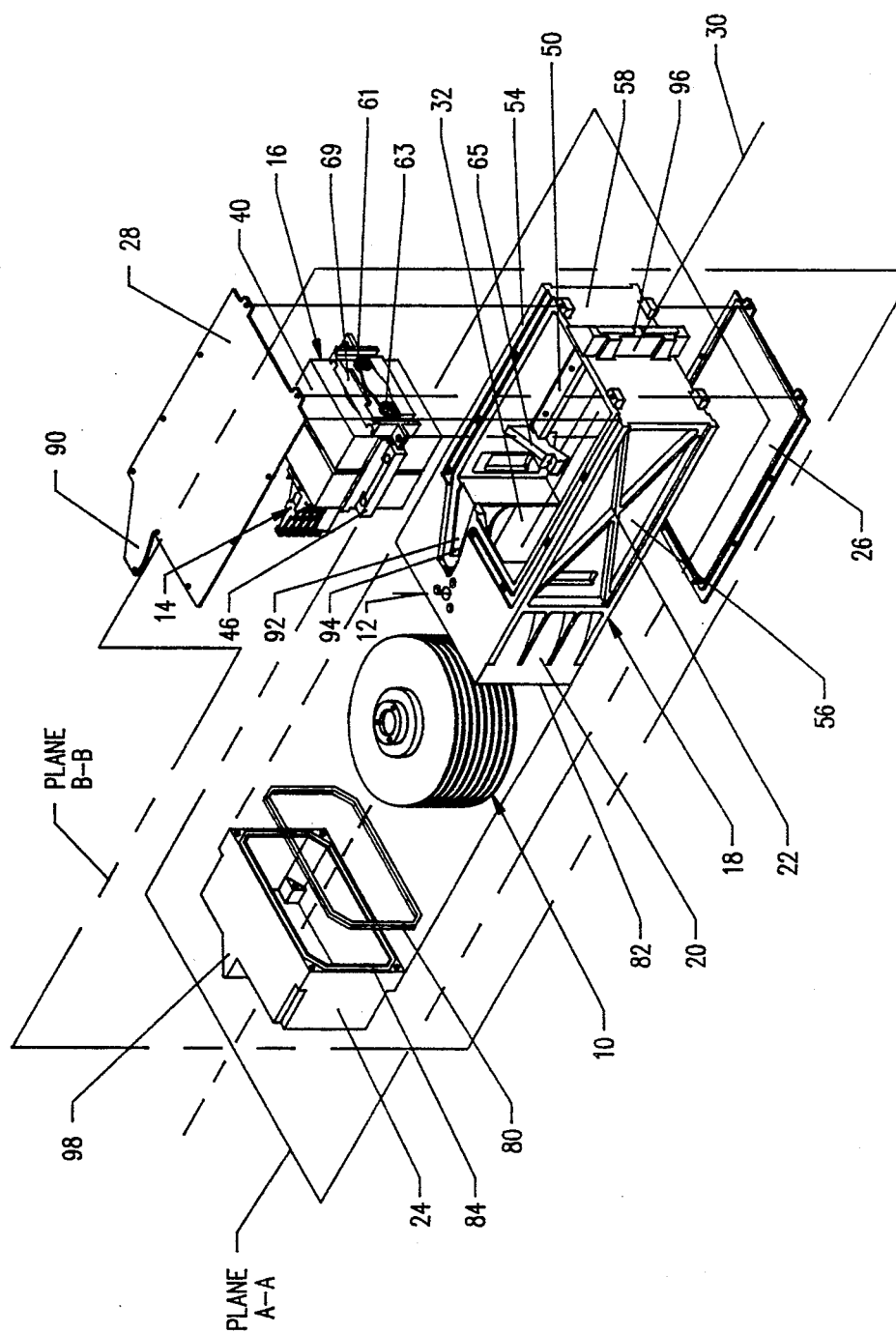
FIG. 1 is an exploded perspective view illustrating the major components of the disk file and housing with respect to the two perpendicular planes.

The major components of the disk file are shown in the exploded perspective view of FIG. 1. The data recording disks are part of a disk stack subassembly 10. The data recording heads for accessing respective surfaces of the disks are part of the head/arm assembly 14 which is attached to the coil portion of the voice coil motor (VCM) 16. The sole support structure for disk stack subassembly 10 and VCM 16 is the single-piece casting 18, which is preferably formed of an aluminum alloy. The disk stack subassembly 10 is entirely supported within the open-ended portion 20 and the VCM 16 is entirely supported within the actuator portion 22 of casting 18. The disk file housing is made complete by an end cap 24 which encloses disk stack subassembly 10 and by cover plates 26, 28 which enclose VCM 16.

There is also illustrated in FIG. 1 two perpendicular planes A—A and B—B which intersect to define a line 30 which serves as the central longitudinal axis of casting 18. Casting 18 is substantially symmetric about both planes A—A and B—B. When the disk stack subassembly 10 is supported within open-ended portion 20 of casting 18, the rotational axis of the disk stack subassembly 10 is located at line 12, which lies within plane B—B and is perpendicular to plane A—A. In addition, when VCM 16 is supported within actuator portion 22, in the manner to be described below, VCM 16 has its own plane of symmetry coplanar with plane A—A and its linear access axis substantially coincident with central axis 30. The heads on head/arm assembly 14 access their respective disk surfaces of disk stack subassembly 10 through an opening 32 between open-ended portion 20 and actuator portion 22 of casting 18.

Figure 2:
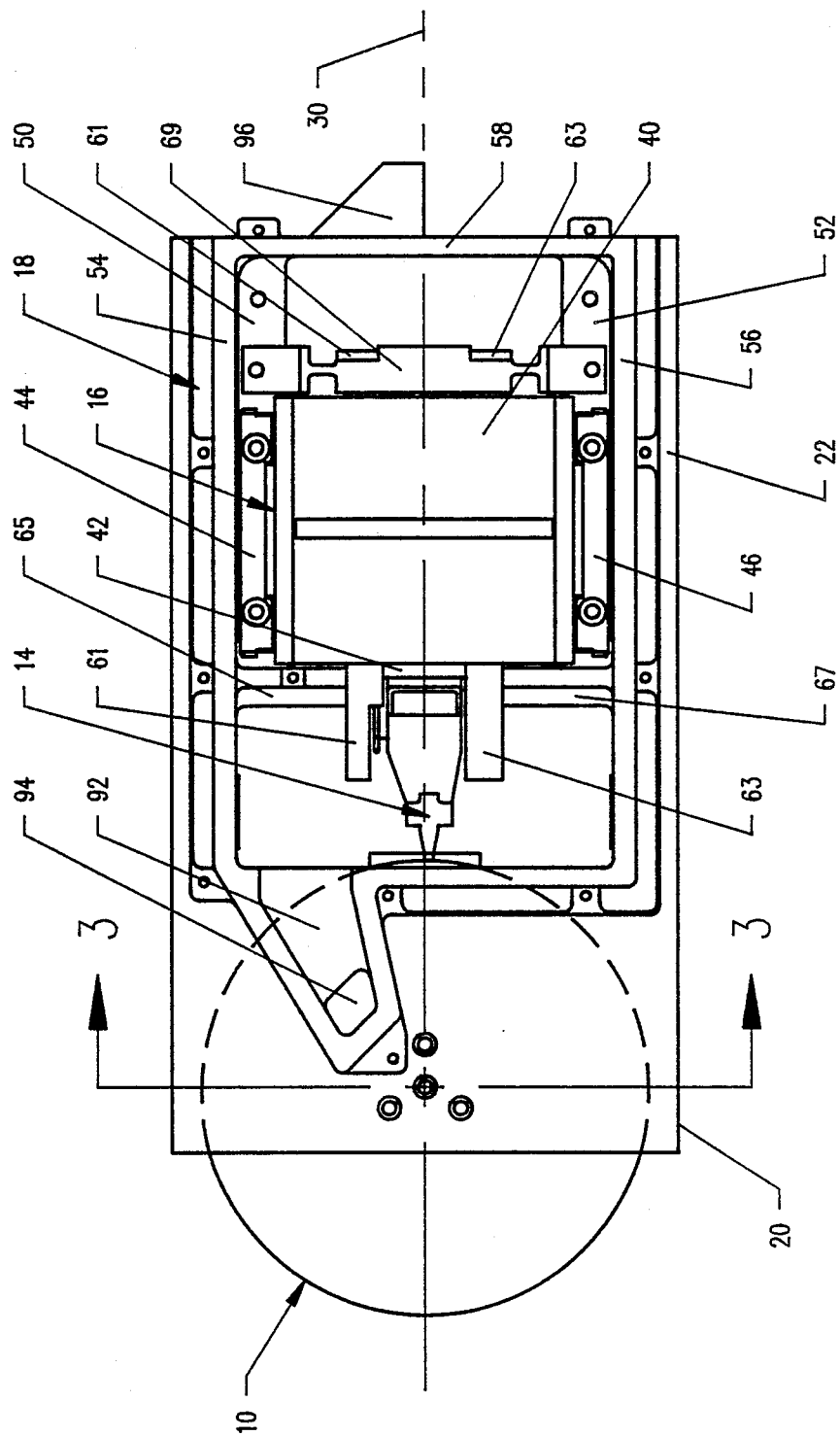
FIG. 2 is a plan view illustrating the disk stack and the linear actuator supported in the single-piece casting forming a part of the housing.

The disk stack subassembly 10 and VCM 16 are shown supported in casting 18 in FIG. 2. The VCM 16 includes a magnet assembly 40 and movable coil 42 (of which only a portion is visible in FIG. 2). The head/arm assembly 14 is attached to the end of coil 42. The magnet assembly 40 has connected to it two brackets 44, 46. The brackets 44, 46 are supported on and mounted to two mounting bosses 50, 52 which are formed on and are a part of side walls 54, 56 of the actuator portion 22. The mounting bosses 50, 52 are formed as part of the casting 18 and thus are integral with side walls 54, 56, which in turn are integral with the open-ended portion 20. The mounting bosses 50, 52 are formed in a plane parallel to plane A—A such that when the brackets 44, 46 are mounted to the bosses 50, 52, the plane of symmetry of VCM 16 is coplanar with plane A—A, i.e., the plane of symmetry of casting 18. In addition, the mutually perpendicular plane of symmetry of VCM 16 is coplanar with plane B—B (FIG. 1). Also shown in FIG. 2 are two guide rails 61, 63 which are attached at one end to extensions 65, 67 from side walls 54, 56 and at the other end to a cross member 69 which in turn is mounted to bosses 50, 52. The guide rails 61, 63 serve as the tracks for the ball bearing assemblies (not shown) attached to the coil and head/arm assembly 14 for movement of the coil and head/arm assembly 14 along linear access axis 30 within the magnet assembly 40. An end wall 58 interconnects the ends of side walls 54, 56 and is integrally formed as part of casting 18.

Figure 3:
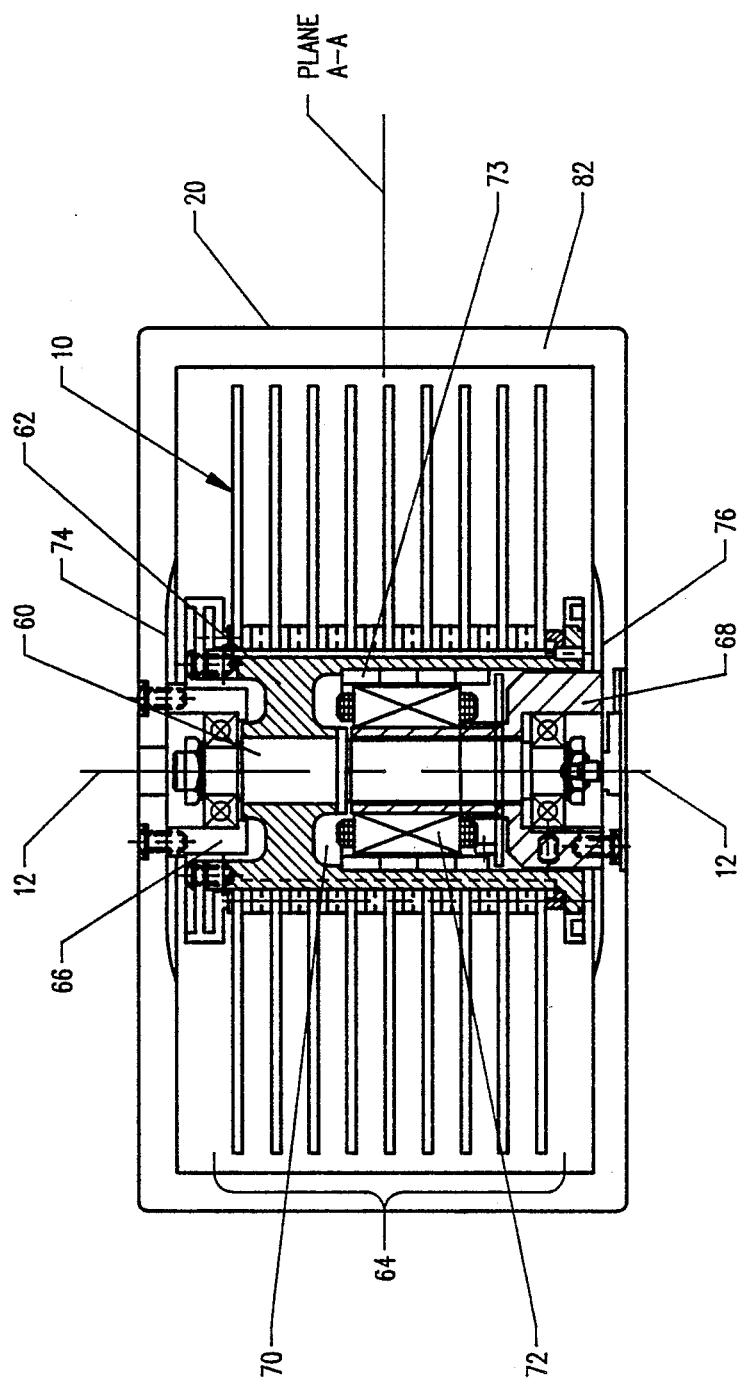
FIG. 3 is an end view of Section 3—3 of FIG. 2 illustrating the disk stack subassembly supported within the two spaced-apart walls of the open ended portion of the housing.

Referring now to FIG. 3, the disk stack subassembly 10 is shown in partial sectional view as being supported within the open-ended portion 20 of casting 18. The disk stack subassembly includes a central shaft 60, a hub 62 attached to the shaft 60, a plurality of disks 64 supported on the hub 62, a pair of bearing assemblies 66, 68 and an in-hub drive motor supported within the cavity 70 defined between shaft 60 and hub 62. The drive motor includes coils 72 attached to the bearing assembly 68 and permanent magnets 73 attached to the inside wall of hub 62. This type of motor is a conventional type of disk drive motor referred to as an "in-hub" motor, which eliminates the need for external connection of a motor and pulley assembly to shaft 60. The bearing assemblies 66, 68 are rigidly secured to interior parallel walls 74, 76 of open-ended portion 20 by means of bolts, thereby securing the outer races of the respective bearings and permitting the shaft 60 with attached hub 62 and magnets 73 to rotate about rotational axis 12. As illustrated in FIG. 3, the open-ended portion 20 of casting 18 is substantially symmetric with respect to plane A—A and the entire disk stack subassembly 10 is supported by and secured to respective parallel interior walls 74, 76.

Referring again to FIG. 1, after the disk stack subassembly 10 and VCM 16 are secured to the casting 18, in the manner as shown in FIGS. 2 and 3, a gasket 80 is mated with surface 82 of open-ended portion 20 and with a like surface 84 of end cap 24. End cap 24 is then secured to casting 18 by means of bolts. This substantially encloses the disk stack subassembly 10 along a plane defined by surface 82 which is essentially perpendicular to central axis 30. When actuator portion covers 26, 28 are then attached to actuator portion 22, the VCM 16 is essentially enclosed and the disk file housing is complete. The disk cover 28 includes an extension 90 which covers a recess 92 and an opening 94 in the open-ended portion 20 of casting 18. The recess 92 and opening 94 permit air to flow between the VCM 16 and the disk stack subassembly 10 during operation of the disk file to assist in cooling and air filtration.

Because the casting 18 is symmetric about both planes A—A and B—B, as shown in FIG. 1, and comprises a single piece of material which entirely supports both the disk stack assembly 10 on its rotational axis 12 and the VCM 16 in its plane of symmetry, there is essentially no bending or distortion of the disk file housing during operation of VCM 16. Any reaction forces caused by movement of the coil within VCM 16 are directed along axis 30, the axis of symmetry, so as to evenly distribute these forces throughout the disk file housing. This construction also essentially eliminates track misregistration caused by thermal gradients. In addition, the unitary construction of casting 18 essentially eliminates uncontrollable resonant frequencies existing between the disk stack subassembly 10 and the VCM 16 because there is no mounting of separate housings to one another.

Referring again to FIG. 1, there is shown an attachment boss 96 on end wall 58 of casting 18 and a like support boss 98 on end cap 24. Each of these bosses 96, 98 has a support surface lying in plane B—B so that the disk file can be mounted in a rack and supported on bosses 96, 98 with plane A—A being the vertical plane. This manner of external mounting of the disk file improves overall performance since the reaction forces caused by movement of the coil within VCM 16 are directed in plane B—B to the external rack mounting, thereby eliminating any unsymmetrical reaction forces.

The embodiment illustrated in the figures, in particular FIG. 1, illustrates VCM 16 being secured to side walls 54, 56 which are parallel to and equally spaced from plane B—B. It is also within the scope of the present invention to provide mounting of the VCM in a single-piece casting which has side walls parallel to and equally spaced from plane A—A. In such a disk file configuration, both the disk stack subassembly and the VCM would be mounted to planes parallel to one another, rather than planes mutually perpendicular to one another.

While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A structure for use in a disk file for supporting a disk stack subassembly having a central rotational axis and a linear actuator having a central linear access axis, the support structure comprising:

a single-piece casting being substantially symmetric with respect to first and second perpendicular planes and having (a) an open-ended portion with two interior walls parallel to and equally spaced from the first plane for supporting the disk stack subassembly with its rotational axis in the second plane, and (b) an actuator portion with two parallel side walls equally spaced from the intersection of the first and second planes for supporting the actuator with its linear access axis generally collinear with the intersection of the first and second planes.

2. The structure according to claim 1 wherein the single-piece casting further comprises an end wall interconnecting the side walls and thereby providing an enclosure for the actuator.

3. The structure according to claim 1 further comprising an end cap for attachment to the open-ended portion of the single-piece casting so as to provide an enclosure for the disk stack subassembly.

4. The structure according to claim 3 wherein the end cap and the open-ended portion of the single-piece casting each has a mating surface defining a third plane generally perpendicular to the intersection of the first and second planes.

5. The structure according to claim 1 wherein the two side walls of the actuator portion of the casting are parallel to and equally spaced from the second plane.

6. The structure according to claim 5 wherein each side wall includes a mounting boss having a mounting surface parallel with the first plane for mounting the actuator with its plane of symmetry substantially coplanar with the first plane.

7. A data recording disk file comprising:
  a disk stack subassembly further comprising a shaft, a pair of bearing assemblies connected to respective ends of the shaft for permitting rotation of the shaft about an axis, a hub secured to the rotatable shaft and extending radially outwardly from the shaft so as to define a cavity, a disk drive motor located within the cavity and connected to the hub and one of the bearing assemblies, and a plurality of disks supported on the hub;
  a linear voice coil motor (VCM) actuator further comprising a magnet assembly, a coil movable relative to the magnet assembly along a linear access axis, and a plurality of heads attached to the coil for accessing the disks;
  a single-piece casting being substantially symmetric with respect to first and second perpendicular planes and having (a) an open-ended portion with two interior walls parallel to and equally spaced from the first plane, and (b) an actuator portion with two side walls parallel to and equally spaced from the second plane, the bearing assemblies of the disk stack subassembly being secured to respective interior walls of the open-ended portion with the shaft rotational axis in the second plane, and the VCM actuator being secured to the side walls of the actuator portion with the linear access axis of the coil substantially collinear with the intersection of the first and second planes;
  an end cap attached to the open-ended portion of the casting, whereby the disk stack subassembly is substantially enclosed; and
  means attached to the actuator portion of the casting for substantially enclosing the VCM actuator.

8. The disk file according to claim 7 wherein the casting includes an end wall interconnecting the two side walls, and wherein the means for enclosing the VCM actuator further comprises said end wall and cover plates attached to the side walls and the end wall.

9. The disk file according to claim 8 further comprising an attachment boss on the end wall and an attachment boss on the end cap, each of the attachment bosses having a support surface essentially in the second plane for supporting the disk file.

10. The disk file according to claim 7 wherein each of the side walls of the casting actuator portion has a mounting boss with a mounting surface parallel to the first plane; and further comprising means for securing the magnet assembly of the VCM to the mounting surfaces of the actuator portion bosses, whereby the VCM actuator is supported in the casting with its plane of symmetry substantially coplanar with the first plane.

* * * * *